United States Patent [19]
Huang

[11] 3,984,219
[45] Oct. 5, 1976

[54] ENGINE EXHAUST PURIFIER-MUFFLER

[76] Inventor: Ming-Dao Huang, No. 7-2, Chien Hsing Second St., Ku Shan District, Kao Hsiung, China /Taiwan

[22] Filed: Dec. 31, 1975

[21] Appl. No.: 645,782

[52] U.S. Cl. .................................. 55/227; 55/255; 55/256; 55/DIG. 30; 60/310
[51] Int. Cl.² ......................................... B01D 47/02
[58] Field of Search ............. 55/227, 234, 255, 256, 55/DIG. 30; 60/310, 311

[56] References Cited
UNITED STATES PATENTS

| | | | |
|---|---|---|---|
| 1,243,472 | 10/1917 | Wilson | 55/234 |
| 3,391,521 | 7/1968 | Pal | 55/256 |
| 3,695,005 | 10/1972 | Yuzawa | 55/256 |
| 3,712,029 | 1/1973 | Charlton | 55/DIG. 30 |

*Primary Examiner*—Bernard Nozick
*Attorney, Agent, or Firm*—Burns, Doane, Swecker & Mathis

[57] ABSTRACT

Engine Exhaust Purifier-Muffler comprising a box type body, a cylindrical filter connected to the exhaust pipe of engine is located at rear bottom conner inside the box, a plurality of perforated plate filter elements are stepwisely disposed inside the box to reach toward the top, under the ceiling, a filter of square cross section is further provided, after the said filter, an outlet section is provided to connect to an outlet pipe. Porous plastic material such as polyurethane foam is used as filter medium in all the abovesaid filters. Water is half filled within the box. The box is also provided with a water inlet, an overflow opening and a drain for discharge the water. Waste gas passes through water and filter elements discharged from the outlet contains much less hazardous components and is eliminated from noise.

5 Claims, 6 Drawing Figures

ENGINE EXHAUST PURIFIER-MUFFLER

FIELD OF INVENTION

The present invention relates generally to Engine exhaust purifier-muffler and more particularly relates to a box type purifier-muffler comprising let the engine exhaust gas pass through water and a series of filter elements where porous plastic material such as polyurethane foam is employed as filter medium. The outlet gas from the said box is eliminated greatly in hazardous components and noise.

BACKGROUND OF INVENTION

Air pollution has been a serious problem all over the world. Engine exhaust either resulted from industries or motor vehicles constitutes the chief source of air pollution. The worst pollutants including carbon monoxide, hydrocarbons, nitrogen oxides and sulfur oxides ect. have known to all, and various means have been devised to eliminates them from forming killing smogs. The abovementioned chemical compounds floating in the air can interact with sun and form photochemical smog which is also bad to health. Besides, engine exhaust gives noise.

Those devices so far provided could seldom give a cure all result and usually the costs are high.

SUMMARY OF INVENTION

Therefore the main object of the present invention is to provide an engine exhaust purifier-muffler that is simple in construction and using water and a series of filter elements made of porous plastic material such as polyurethane foam yet quite effective.

Another object of the present invention is to provide an engine exhaust purifier-muffler which can eliminate noise in a great extent.

Still another object of the present invention is to provide an engine exhaust purifier-muffler which would give satisfactory performance without sacrifice of the pull and horse power of the engine, even contribute the saving of fuel to some extent.

Other objects and features will become apparent from the following detailed description to be taken in conjunction with the annexed drawings.

DETAIL DESCRIPTION OF EMBODIMENT

Figure 1:
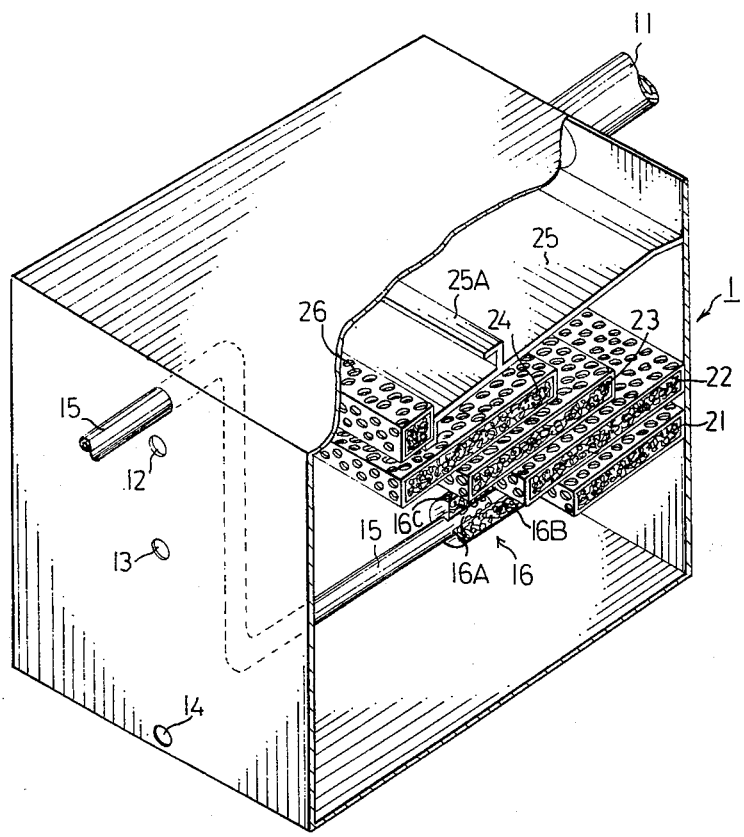
FIG. 1 is a perspective view of a preferred embodiment of the present invention with partial cut away to show the details of construction.
Figure 2:
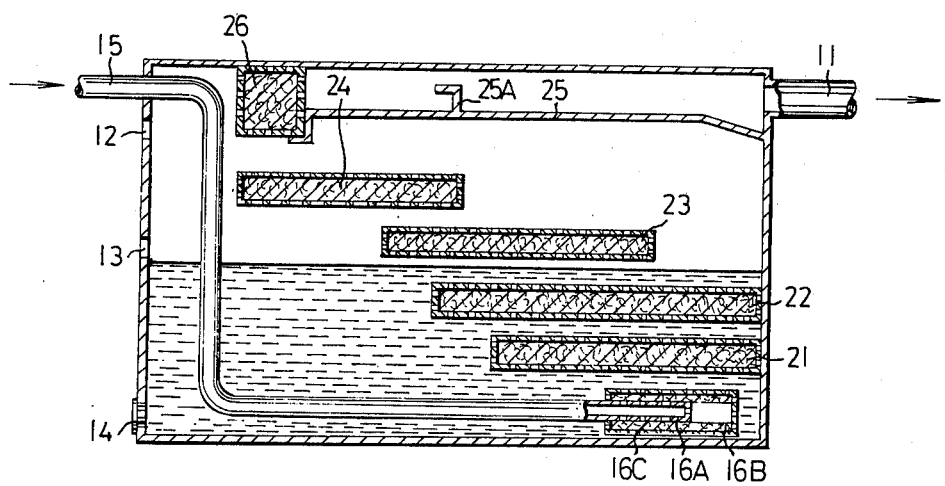
FIG. 2 is a longitudinal cross section of the above embodiment.

Referring to FIG. 1 and FIG. 2, the engine exhaust purifier-muffler of the present invention comprises a box type case 1, in front of which an inlet pipe 15 is provided to be connected to the engine exhaust pipe. Pipe 15 is led to the bottom inside the box and connected to a multiwall cylindrical filter 16. The pipe 15 ends with a perforated section 16A which stops at half length of the filter 16. Concentric with and surrounding the perforated section 16A is a dual wall cylinder. Porous plastic material such as polyurethane foam is used as filter medium and filled between the cylindrical walls.

On the front wall of the box 1, openings 12, 13 and 14 are provided at various level from top for charge, overflow and drain of water which serves as purifying medium. The water level is kept at about half of the height of the box and drained daily and refilled with fresh water.

On top of cylindrical filter 16, stepwisely disposed from bottom toward top, are plate type filter elements 21, 22, 23 and 24, each of which is of perforated frame filled with porous plastic material such as polyurethane. Among these filters, filters 21 and 22 are submerged under water level.

On top of filter 24, close to the ceiling of the box is another filter 26 having same perforated construction and filled with same filter medium as other filters except that it has square cross section, extended after this filter 24, an outlet section formed by a partition 25 is led to an outlet pipe 11, for the discharge of purified waste gas. At half way on the partition 25, an angle member 25A is provided to prevent the entrainment of water from carrying over to the outlet.

In using, water is first charged through opening 12 to a level under overflow opening 13, connect inlet pipe 15 to the exhaust pipe, the exhaust gas passes through the cylindrical filter giving turburent to settle the unburnt carbon particles, the gas bubbling through filters 21 and 22 would cause water soluble components removed. Then the gas is further filtered by filters 23, 24 and 25, discharged through outlet section 25 to outlet pipe 11. Noise is eliminated in the same time with considerable amount of the hazadous components.

Experiments were conducted to show the satisfactory effect of the device:

Conducted by professor Won-ton Young on May 10th, 1974 in the Heat Transfer Lab., Department of Mechanical Engineering, Engineering School, National Taiwan University.

The engine used is a German motor boat diesel engine without an exhaust muffler. Data were taken with and without installation of the purifier-muffler of the present invention, conditions:

Temperature: 23°c (dry bulb), 21°c (wet bulb)
nozzole pressure: 100 kg/cm$^2$
fuel: ordinary diesel oil (Sp. gr.: 0.83)
The results are as follows:

| Engine revolutions r.p.m. | Net pull power (kg) | | Brake HP. B. HP. | | Smoke Density (%) | | Time Duration/ 20 cc Fuel (sec.) | | Specific fuel consumption | |
|---|---|---|---|---|---|---|---|---|---|---|
| | not installed | installed | NI | I | NI | I | NI | I | NI | I |
| 600 | 14 | 13.7 | 8.40 | 8.22 | 16–19 | 0–1 | 31 | 35 | 229.49 | 225.85 |
| 700 | 14.1 | 14.2 | 9.87 | 9.74 | 38–45 | 0–1 | 27 | 31 | 224.24 | 224.24 |
| 800 | 14.2 | 14.4 | 11.36 | 11.52 | 28–35 | 0–1 | 23 | 28 | 228.72 | 228.72 |
| 900 | 14.1 | 14.3 | 12.69 | 12.87 | 55–58 | 0–1 | 20 | 22 | 235.46 | 230.55 |

-continued

| Engine revolutions r.p.m. | Net pull power (kg) not installed | Net pull power (kg) installed | Brake HP. B. HP. NI | Brake HP. B. HP. I | Smoke Density (%) NI | Smoke Density (%) I | Time Duration/ 20 cc Fuel (sec.) NI | Time Duration/ 20 cc Fuel (sec.) I | Specific fuel consumption NI | Specific fuel consumption I |
|---|---|---|---|---|---|---|---|---|---|---|
| 1000 | 14 | 14 | 14.00 | 14.10 | 28–34 | 0–1 | 18 | 19 | 237.14 | 235.46 |

Figure 3:
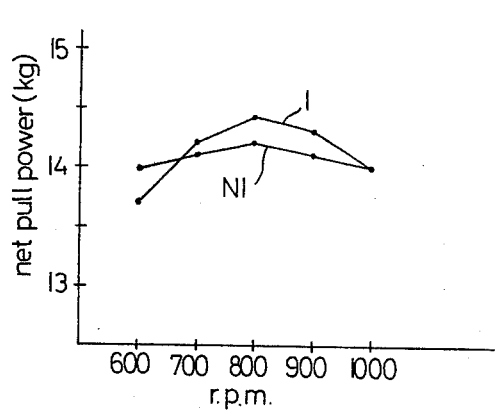
FIGS. 3 thru 6 are performance curves.
Figure 5:
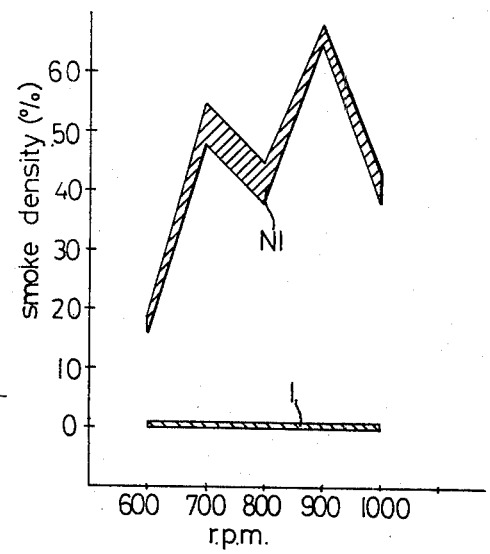
Figure 4:
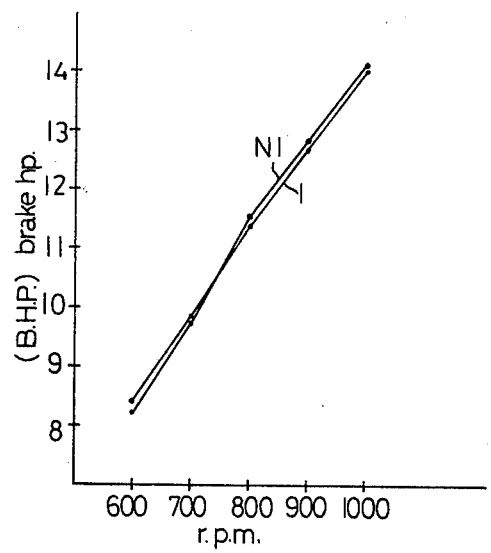
Figure 6:
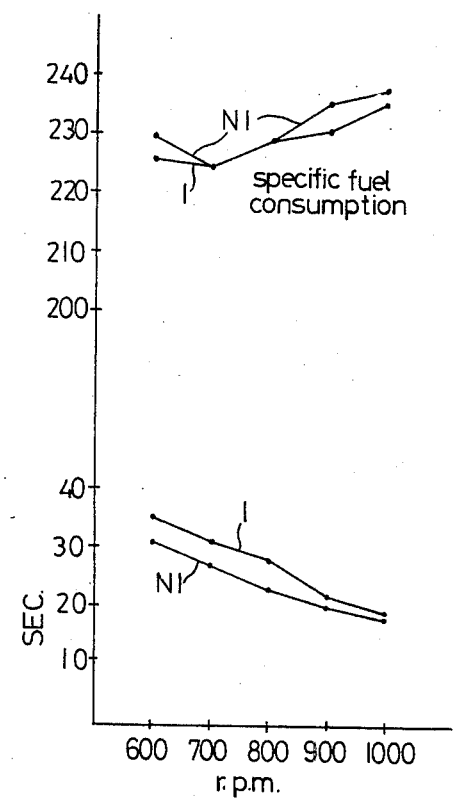

The abovesaid experiment revealed that with the installation of the exhaust gas purifier-muffler, the net pull of the engine improved at higher r.p.m. (see FIG. 3), correspondingly, the Brake HP also bettered during higher r.p.m. of the engine (FIG. 4), Smoke density was significantly reduced (FIG. 5), and time duration per 20cc of fuel and the specific fuel consumption improved a lot (FIG. 6) which has definite meaning during the energy crisis.

EXPERIMENT 2

Gas purification effect as measured by Kao Hsiung Refinery, China Petroleum Corporation showed:

| Fuel used | Waste gas | not installed | Installed |
|---|---|---|---|
| Diesel | CO | 56 ppm | 16 ppm |
| Diesel | $SO_2$ | 39.6 ppm | 6.9 ppm |

This revealed the prominent purifying effect.

The abovesaid experiments are made with diesel engine and the said purifier-muffler has been installed on a diesel truck owned by the present inventor, the filter elements would last 150,000 Kms before change of the filter medium becomes necessary. The reduction of CO content amounted to 72% and that of $SO_2$ to 80%. The result is significant.

The above embodiment is given only for illustration purpose and not by way of limitation, and modification will become evident to those skilled in the art which will fall within the scope of attached claims.

I claim:

1. Engine Exhaust Purifier-Muffler comprising a box type body having inlet and outlet and a series of filter elements contained therein and characterized by that a perforated cylindrical filter connected through the inlet to the exhaust pipe of an engine being located at rear bottom corner inside the box, a plurality of perforated plate type filter elements being stepwisely disposed inside the box to reach toward the top, under the ceiling of the box, a perforated filter having square cross section being provided, after the said filter, an partitioned outlet section being provided to connect to the outlet of the box, all the filters being filled with porous plastic material as filter medium, water being half filled within the box.

2. Engine exhaust purifier-muffler according to claim 1, the said box is also provided with openings disposed at different levels from top to bottom for charge, overflow and drain of water.

3. Engine exhaust purifier-muffler according to claim 1, wherein the partitioned outlet section extends after the filter having square cross section under the ceiling of the box, and an angle member is provided at the half way on the partition to prevent the entrainment of water from carrying over to the outlet.

4. Engine exhaust purifier-muffler according to claim 1 wherein the cylindrical filter having a dual perforated wall, filter medium is filled therebetween inlet pipe connecting the exhaust pipe of the engine having perforated end to stop at half length of the cylindrical filter.

5. Engine exhaust purifier-muffler according to claim 1, wherein the porous plastic material used as filter medium is polyurethane foam.

* * * * *